(12) United States Patent
Maskatia

(10) Patent No.: US 7,184,263 B1
(45) Date of Patent: Feb. 27, 2007

(54) PORTABLE COMPUTER

(75) Inventor: Arif Maskatia, Milpitas, CA (US)

(73) Assignee: Acer Inc., Taipei Hsien (TW)

( * ) Notice: Subject to any disclaimer, the term of this patent is extended or adjusted under 35 U.S.C. 154(b) by 14 days.

(21) Appl. No.: 11/197,170

(22) Filed: Aug. 4, 2005

(51) Int. Cl.
*G06F 1/16* (2006.01)

(52) U.S. Cl. .................... 361/683; 248/917; 349/58

(58) Field of Classification Search ........ 361/679–687, 361/724–727; 248/917, 922; 349/58, 28; 108/44; 414/803
See application file for complete search history.

(56) References Cited

U.S. PATENT DOCUMENTS

| | | | |
|---|---|---|---|
| 6,282,082 B1 * | 8/2001 | Armitage et al. ........... | 361/681 |
| 6,687,119 B2 * | 2/2004 | Lai et al. .................... | 361/683 |
| 6,947,279 B2 * | 9/2005 | Cheng et al. ............... | 361/683 |
| 7,019,964 B1 * | 3/2006 | Maskatia et al. ........... | 361/683 |

* cited by examiner

*Primary Examiner*—Hung Van Duong
(74) *Attorney, Agent, or Firm*—Kirschstein, et al.

(57) ABSTRACT

A portable computer includes: an expansion base module; a system module having a rear side and a connecting end that is slidably pivoted to the expansion base module; and a stand having a first end that is pivoted to a rear end of the expansion base module, and a second end that is pivoted to the rear side of the system module such that the system module, the stand, and the expansion base module are stacked one above the other when the connecting end of the system module is disposed at a front end of the expansion base module, and that the stand and the system module stand from the expansion base module when the connecting end of the system module is disposed at a position between the front end and the rear end of the expansion base module.

4 Claims, 6 Drawing Sheets

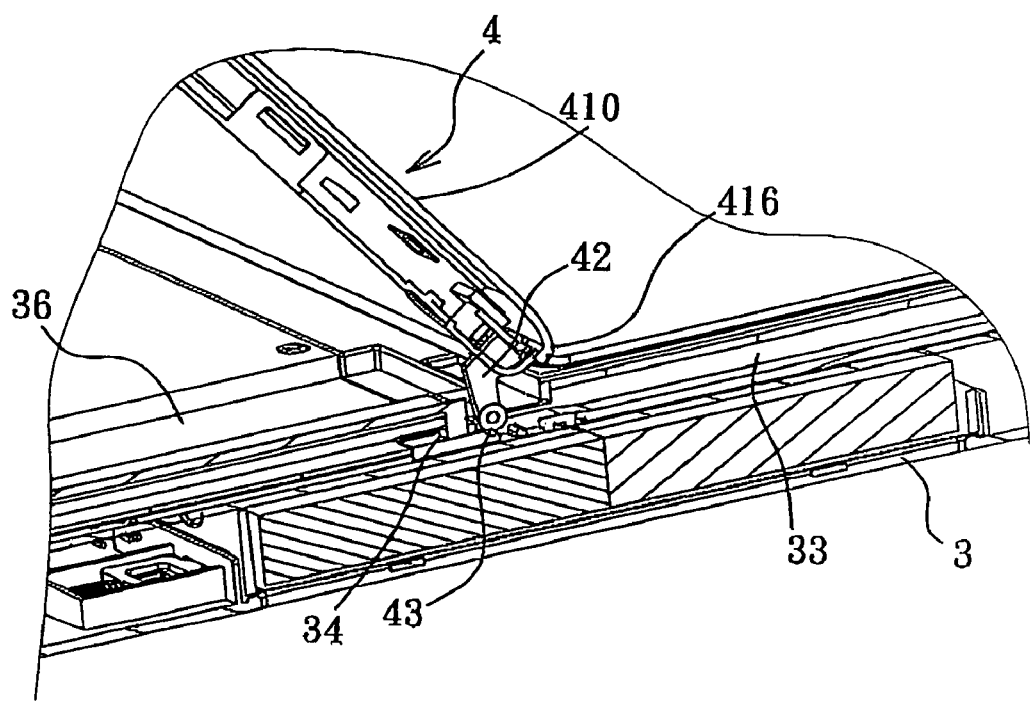
F I G. 7

PORTABLE COMPUTER

BACKGROUND OF THE INVENTION

1. Field of the Invention

This invention relates to a portable computer, more particular to a portable computer including an expansion base module and a slate that is slidable on the expansion base module.

2. Description of the Related Art

U.S. Pat. No. 5,548,478 discloses a portable computer having a base module and a display panel that is mounted slidably on the base module. The display module is pivotable relative to the base module so as to lie on top on the base module when the display module is slid to a front end of the base module. As such, the portable computer can serve as a tablet computer.

In a co-pending U.S. patent application Ser. No. 10/456, 536, a portable computer is disclosed. The portable computer includes an expansion base module and a slate with a display panel mounted slidably on the expansion base module through a hinge mechanism.

The aforesaid portable computers have a common disadvantage in that, since pivoting movement and sliding movement of the display panel relative to the base module are independent from each other, two operations are required to perform the pivoting movement and sliding movement of the display panel when operation of the portable computer is to be changed from a tablet computer state to a notebook computer state or when the operation of the portable computer is to be changed from the notebook computer state to the tablet computer state.

U.S. Pat. No. 6,700,775 discloses a portable computer that includes a base module, a stand pivoted to the base module, and a display panel mounted on the stand. The display panel, as well as the stand, is not slidable on the base module.

SUMMARY OF THE INVENTION

Therefore, the object of the present invention is to provide a portable computer that is capable of overcoming the aforesaid drawback of the prior art.

According to the present invention, there is provided a portable computer that comprises: an expansion base module with a keyboard provided thereon, the expansion base module having front and rear ends; a system module having a display side, a rear side that is opposite to the display side, a free end, and a connecting end that is opposite to the free end, that is pivoted to the expansion base module, and that is slidable on the expansion base module between the front and rear ends of the expansion base module; and a stand having a first end that is pivoted to the rear end of the expansion base module, and a second end that is opposite to the first end and that is pivoted to the rear side of the system module at a position between the connecting end and the free end of the system module such that the system module, the stand, and the expansion base module are stacked one above the other when the connecting end of the system module is disposed at the front end of the expansion base module, and that the stand and the system module stand from the expansion base module when the connecting end of the system module is disposed at a position between the front and rear ends of the expansion base module.

BRIEF DESCRIPTION OF THE DRAWINGS

In drawings which illustrate an embodiment of the invention,

FIG. 7 is a fragmentary enlarged sectional side view of the preferred embodiment to illustrate how a roller on a slate computer of the preferred embodiment is stopped by a stopper.

DETAILED DESCRIPTION OF THE PREFERRED EMBODIMENT

Figure 1:
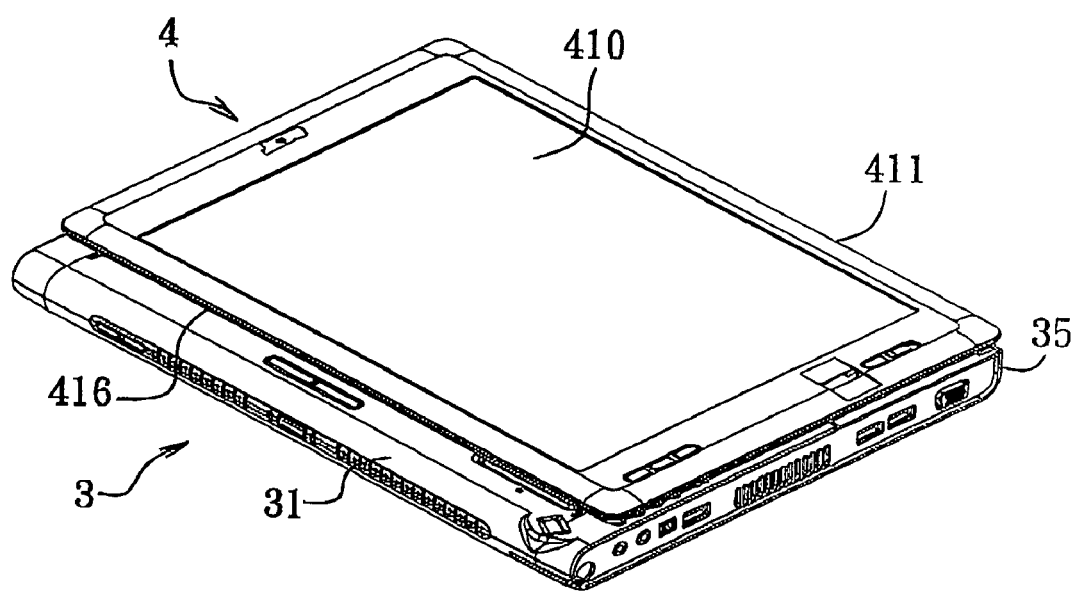
FIG. 1 is a perspective view of the preferred embodiment of a portable computer according to this invention to illustrate a first state where the portable computer is used as a tablet computer.

FIGS. 1 to 5 illustrate the preferred embodiment of a portable computer according to the present invention. The portable computer includes an expansion base module 3, a system module 4, and a stand 5.

The system module 4 can be a liquid crystal display (LCD) panel, a touch input panel, or a slate computer (which normally includes a mother board, a CPU, a memory unit, a touch input display panel, a hard disk, a battery unit, and electronic components which allow the computer slate to function as a portable computer). In this embodiment, the system module 4 is a slate computer.

The expansion base module 3 is provided with a keyboard 32 thereon, and has front and rear ends 31, 35. For expansion purposes, the expansion base module 3 can include devices (not shown), such as a touch pad, an expansion hard disk, expansion batteries, speakers, USB ports, parallel ports, a VGA card, and an external power interface.

The system module 4 has a display side 410, a rear side 412 (see FIG. 5) that is opposite to the display side 410, a free end 411, and a connecting end 416 that is opposite to the free end 411, that is pivoted to the expansion base module 3, and that is slidable on the expansion base module 3 between the front and rear ends 31, 35 of the expansion base module 3.

Figure 2:
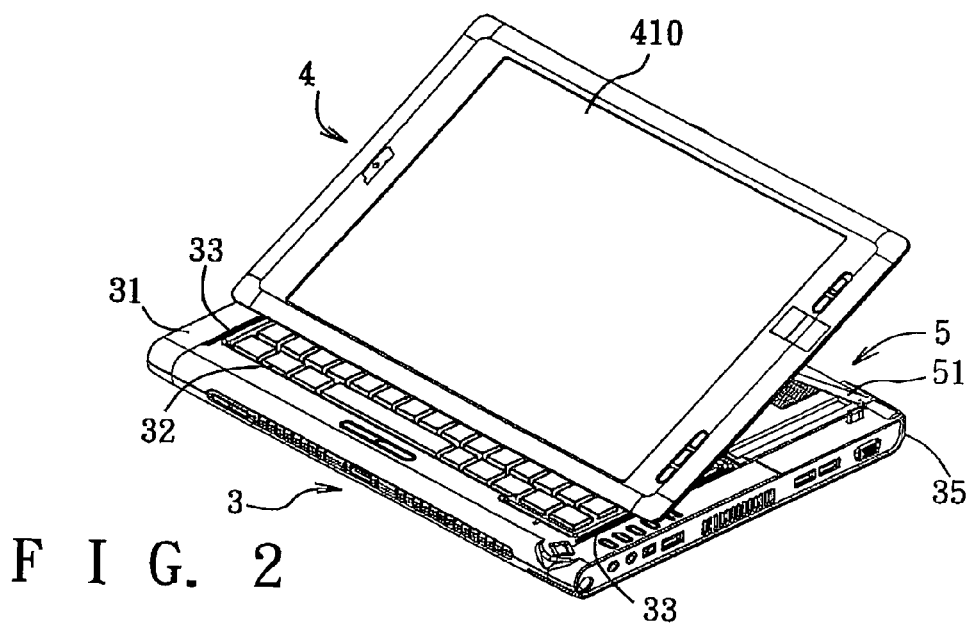
FIG. 2 is a front perspective view of the preferred embodiment to illustrate an intermediate state where the portable computer is disposed.
Figure 3:
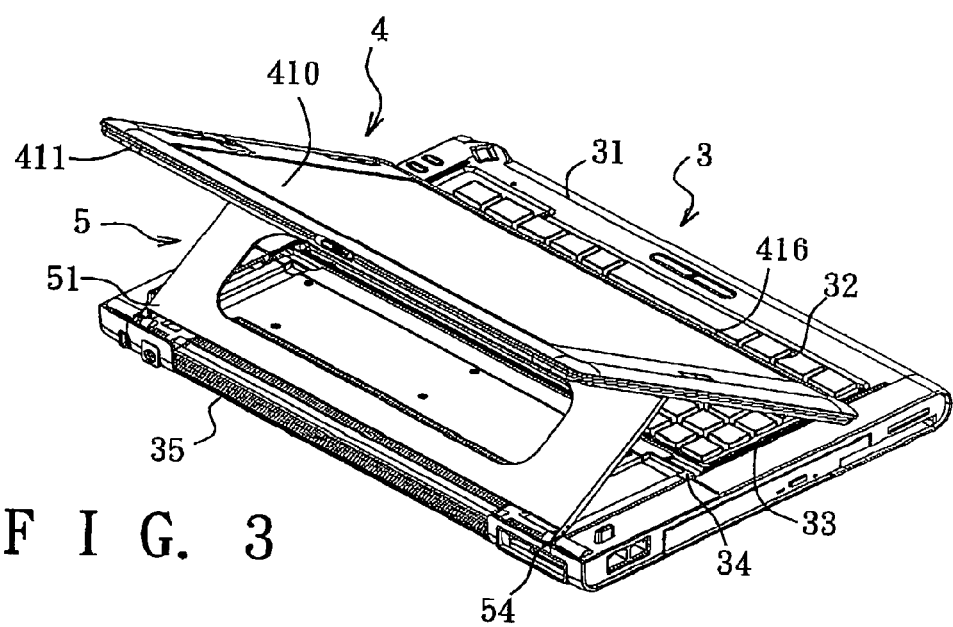
FIG. 3 is a rear perspective view of the preferred embodiment disposed at the intermediate state.
Figure 4:
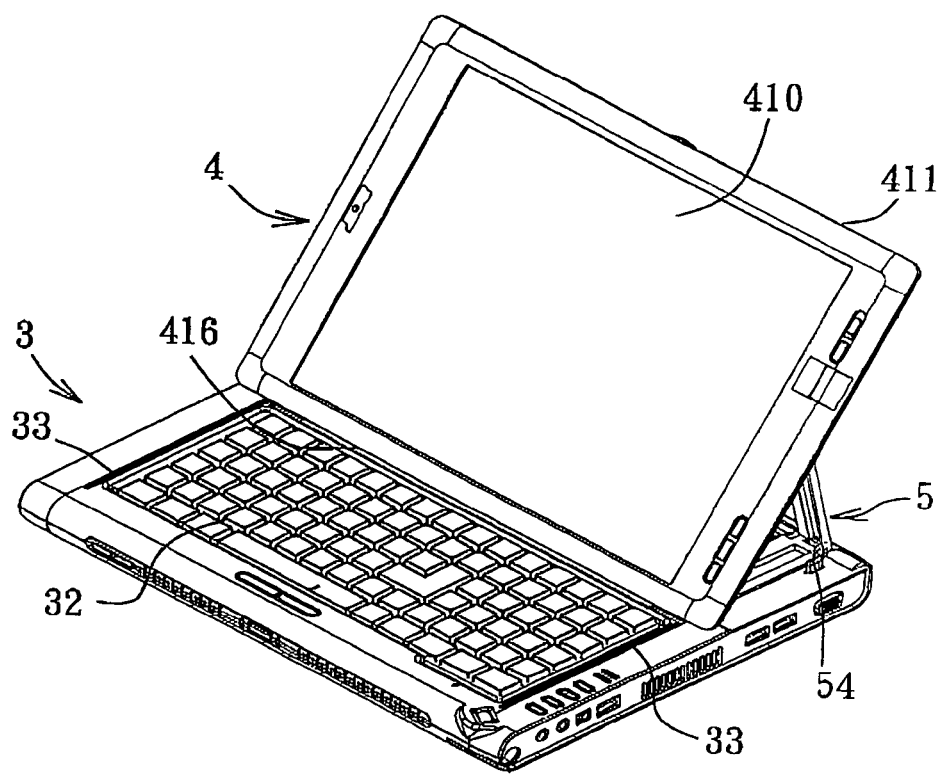
FIG. 4 is a front perspective view of the preferred embodiment to illustrate a second state where the portable computer is used as a notebook computer.

The stand 5 has a first end 51 that is pivoted to the rear end 35 of the expansion base module 3 through a first pivot mechanism 54, and a second end 52 that is opposite to the first end 51 and that is pivoted to the rear side 412 of the system module 4 at a position between the connecting end 416 and the free end 411 of the system module 4 through a second pivot mechanism 53 so that through the stand 5 the portable computer can be operated between a first state, i.e., the system module 4, the stand 5, and the expansion base module 3 are stacked one above the other when the connecting end 416 of the system module 4 is disposed at the front end 31 of the expansion base module 3 (see FIG. 1), thereby permitting the portable computer to serve as a tablet computer, and a second state, i.e., the stand 5 and the system module 4 stand from the expansion base module 3 when the connecting end 416 of the system module 3 is disposed at a position between the front and rear ends 31, 35 of the expansion base module 3 (see FIGS. 4 and 5), thereby permitting the portable computer to serve as a notebook computer. FIGS. 2 and 3 illustrate an intermediate state, which is between the first and second states, where the portable computer is disposed.

In this embodiment, the stand 5 is in the form of a thin plate.

The keyboard 32 has two opposite sides. The expansion base module 3 is formed with a pair of guiding grooves 33 that are disposed at the sides of the keyboard 32, respectively. The connecting end 416 of the system module 4 is formed with a pair of protrusions 42 (see FIGS. 5 to 7) that that are respectively provided with rollers 43 extending into the guiding grooves 33, respectively, so as to permit sliding movement of the system module 4 on the expansion base module 3.

Figure 5:
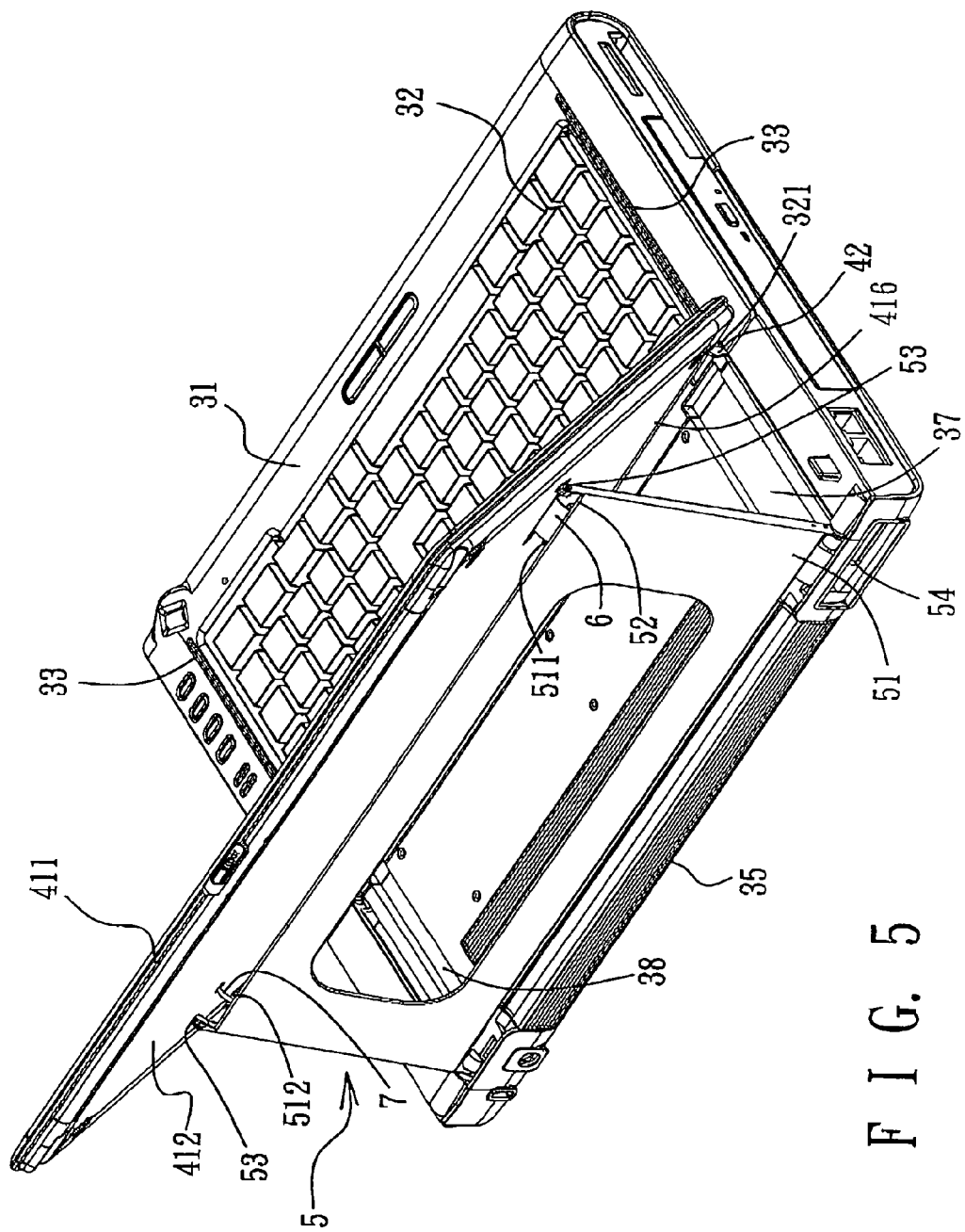
FIG. 5 is a rear perspective view of the preferred embodiment disposed at the second state.

The keyboard 32 further has a rear end 321 (see FIG. 5). The expansion base module 3 is further formed with a pair of stoppers 34 (see FIG. 7) that are disposed adjacent to the rear end 321 of the keyboard 32 and that are aligned with the guiding grooves 33, respectively, so as to prevent further rearward movement of the connecting end 416 of the system module 4 beyond an imaginary stop line defined by the stoppers. 34. It is noted that the portable computer is retained at the second state (See FIG. 6) by a friction among each of the rollers 43 and two groove-defining walls of the respective one of the guiding grooves 33.

Figure 6:
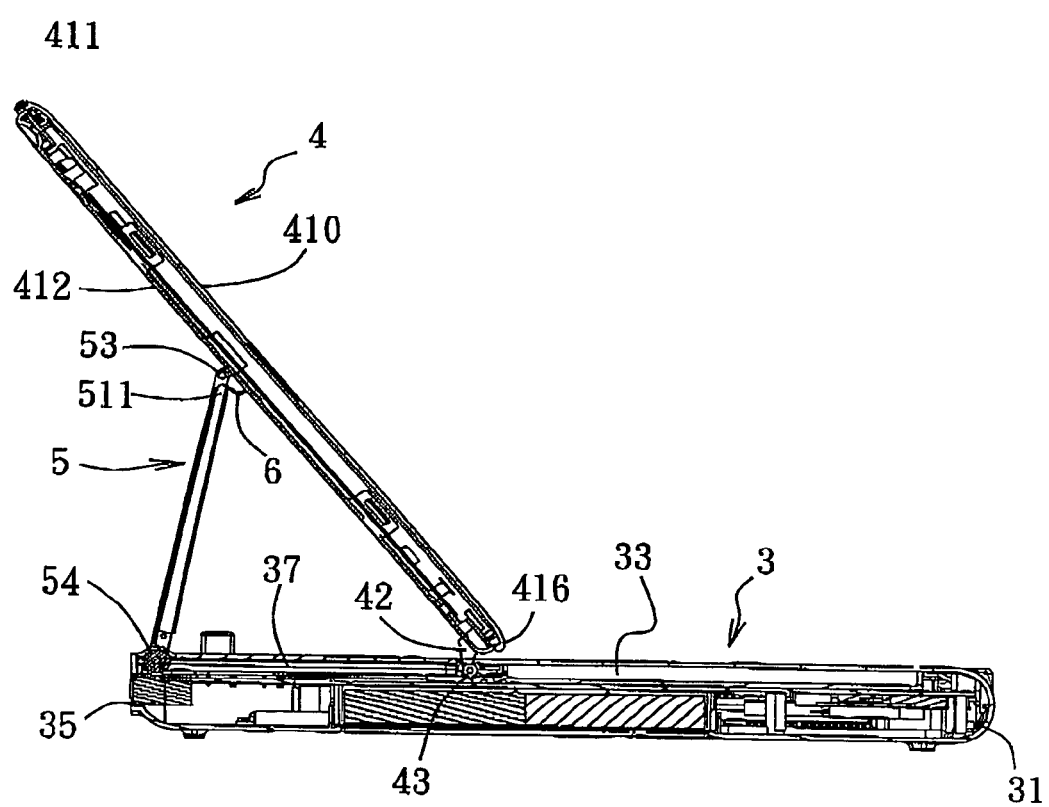
FIG. 6 is a sectional side view of the preferred embodiment disposed at the second state.

Referring to FIGS. 5 and 6, a flexible flat printed circuit cable 6 and an electric wire 7 are provided to couple electrically the system module 4 and the expansion base module 3. The stand 5 is formed with a cable-receiving conduit 511 for extension of the flat printed circuit cable 6 therein, and a wire-receiving conduit 512 for extension of the electric wire 7 therein. The expansion base module 3 is further formed with first and second recesses 37, 38 for receiving the cable-receiving conduit 511 and the wire-receiving conduit 512, respectively, when the portable computer is disposed at the first state.

During use, when it is desired to change operation of the portable computer from the first state (see FIG. 1) to the second state (see FIGS. 4 and 5), and vice versa, the user needs to simply operate the free end 411 of the system module 4 to perform simultaneous sliding and pivoting movements of the system module 4 relative to the expansion base module 3. As such, the aforesaid drawback, which requires two operations to perform the sliding and pivoting movements of the display panel, associated with the prior art can be eliminated.

With the invention thus explained, it is apparent that various modifications and variations can be made without departing from the spirit of the present invention.

What is claimed is:

1. A portable computer comprising:
   an expansion base module with a keyboard provided thereon, said expansion base module having front and rear ends;
   a system module having a display side, a rear side that is opposite to said display side, a free end, and a connecting end that is opposite to said free end, that is pivoted to said expansion base module, and that is slidable on said expansion base module between said front and rear ends of said expansion base module; and
   a stand having a first end that is pivoted to said rear end of said expansion base module, and a second end that is opposite to said first end and that is pivoted to said rear side of said system module at a position between said connecting end and said free end of said system module such that said system module, said stand, and said expansion base module are stacked one above the other when said connecting end of said system module is disposed at said front end of said expansion base module, and that said stand and said system module stand from said expansion base module when said connecting end of said system module is disposed at a position between said front and rear ends of said expansion base module.

2. The portable computer of claim 1, wherein said keyboard has two opposite sides, said expansion base module being formed with a pair of guiding grooves that are disposed at said sides of said keyboard, respectively, said connecting end of said system module being formed with a pair of protrusions that extend into said guiding grooves, respectively, so as to permit sliding movement of said system module on said expansion base module.

3. The portable computer of claim 1, wherein said stand is in the form of a thin plate.

4. The portable computer of claim 2, wherein said keyboard further has a rear end, said expansion base module being further formed with a pair of stoppers that are disposed adjacent to said rear end of said keyboard and that are aligned with said guiding grooves, respectively, so as to prevent further rearward movement of said connecting end of said system module beyond an imaginary stop line defined by said stoppers.

* * * * *